(12) United States Patent
Plath et al.

(10) Patent No.: US 9,090,856 B2
(45) Date of Patent: Jul. 28, 2015

(54) POLYMERIC AGENTS THAT IMPROVE PRIMARY WASHING EFFICIENCY

(71) Applicants: Henkel AG & Co. KGaA, Duesseldorf (DE); Fraunhofer-Gesellschaft zur Foerderung der angewandten Forschung e.V., Munich (DE)

(72) Inventors: Nicole Plath, Duesseldorf (DE); Inga Kerstin Vockenroth, Duesseldorf (DE); Eva-Maria Wikker, Monheim (DE); Benoit Luneau, Ratingen (DE); Andre Laschewsky, Potsdam (DE); Michael Pach, Potsdam (DE); Erik Wischerhoff, Potsdam (DE)

(73) Assignees: Henkel AG & Co. KGaA, Duesseldorf (DE); Fraunhofer Gesellschaft zur Forderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/199,602

(22) Filed: Mar. 6, 2014

(65) Prior Publication Data
US 2014/0187461 A1 Jul. 3, 2014

Related U.S. Application Data

(63) Continuation of application No. PCT/EP2012/066290, filed on Aug. 22, 2012.

(30) Foreign Application Priority Data

Sep. 9, 2011 (DE) .................. 10 2011 112 778

(51) Int. Cl.
*B08B 3/04* (2006.01)
*C11D 3/37* (2006.01)
*C08F 220/56* (2006.01)
*C08F 220/58* (2006.01)

(52) U.S. Cl.
CPC ............ *C11D 3/3719* (2013.01); *C08F 220/56* (2013.01); *C11D 3/3769* (2013.01); *C08F 220/58* (2013.01)

(58) Field of Classification Search
CPC ....... C11D 3/3719; C11D 3/3769; B08B 3/04
USPC .......... 510/475, 499, 501; 134/25.2, 25.3, 39, 134/42; 8/137
See application file for complete search history.

(56) References Cited

U.S. PATENT DOCUMENTS

| | | | |
|---|---|---|---|
| 4,326,970 A * | 4/1982 | Cottrell et al. | 507/225 |
| 4,664,839 A | 5/1987 | Rieck | |
| 4,820,439 A | 4/1989 | Rieck | |
| 5,380,447 A * | 1/1995 | Kirk et al. | 510/276 |
| 5,717,049 A * | 2/1998 | Liao et al. | 526/304 |
| 2010/0240563 A1 | 9/2010 | Jaynes et al. | |

FOREIGN PATENT DOCUMENTS

| | | |
|---|---|---|
| DE | 2412837 | 10/1974 |
| WO | 00/56849 A1 | 9/2000 |
| WO | 01/57171 A1 | 8/2001 |
| WO | 03/054044 A2 | 7/2003 |
| WO | 03/066791 A1 | 8/2003 |

OTHER PUBLICATIONS

PCT International Search Report (PCT/EP2012/066290) dated Oct. 15, 2012.

* cited by examiner

*Primary Examiner* — Brian P Mruk
(74) *Attorney, Agent, or Firm* — Thomas G. Krivulka

(57) ABSTRACT

The primary washing power of washing and cleaning agents was to be improved, in particular with respect to oil- and/or fat-containing stains. This was achieved substantially by the incorporation of polymers that derive from N,N-dimethylacrylamide.

5 Claims, No Drawings

POLYMERIC AGENTS THAT IMPROVE PRIMARY WASHING EFFICIENCY

FIELD OF THE INVENTION

The present invention generally relates to the use of specific polymers to intensify the primary washing power of washing or cleaning agents in particular with respect to oil- and/or fat-containing stains in the context of washing textiles or cleaning hard surfaces, and to washing and cleaning agents that contain such polymers.

BACKGROUND OF THE INVENTION

Besides the ingredients indispensible for the washing process, such as surfactants and builder materials, washing agents as a rule contain further constituents that can be collectively termed "washing adjuvants" and that thus comprise active-agent groups as different as foam regulators, anti-gray agents, bleaching agents, bleach activators, and color transfer inhibitors. Also included among such adjuvants are substances whose presence intensifies the washing power of surfactants although as a rule they themselves do not need to exhibit pronounced surface-active behavior. The same also applies analogously to cleaning agents for hard surfaces. Such substances are often referred to as "washing power intensifiers" or, because of their pronounced action with respect to oil- or fat-based stains, as "fat boosters."

International patent application WO 01/57171 A1 discloses washing or post-washing agents that contain, besides surfactant, copolymers of anionic and cationic monomers as well as, optionally, additionally nonionic monomers.

International patent application WO 00/56849 A1 discloses the color- and shape-retaining action of cationically charged polymers in the context of washing textiles.

The soil-release action of block copolymers of ethylenically unsaturated monomers and alkylene oxides, alkylene glycols, or cyclic ethers is known from international patent application WO 03/054044 A2.

International patent application WO 03/066791 A1 describes polymers, associated on substrate surfaces, that are made up of at least 1 mol % amide-group-containing monomers.

It has been found, surprisingly, that specific polymers that are derived from N,N-dimethylacrylamide have particularly good properties that intensify primary washing power.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Use of poly-(N,N-dimethylacrylamide), and/or of polymers accessible by copolymerization of N,N-dimethylacrylamide with a comonomer selected from acrylamide, methacrylamide, N,N-disubstituted acrylamide, N,N-disubstituted methacrylamide, N',N'-disubstituted aminoalkylmethacrylamide, N,N-disubstituted amino alkylacrylamide, N-acryloylmorpholine, N-acryloylpyrrolidine, N-acryloylpyrrolidone, N-acryloylpiperidone, N-acryloylcaprolactam, N-methacryloylmorpholine, N-methacryloylpyrrolidine, N-methacryloylpyrrolidone, N-methacryloylpiperidone, N-methacryloylcaprolactam, and mixtures thereof, to intensify the primary washing power of washing or cleaning agents with respect to stains in the context of washing textiles or cleaning hard surfaces, where the substituents in the aforesaid substituted compounds are selected from hydrogen, the benzyl group, linear and branched alkyl and alkoxyalkyl groups having 1 to 6 carbon atoms, and mixtures thereof, with the provision that the substituents in the N,N-disubstituted acrylamide are not two methyl groups.

A method for removing in particular oil- and/or fat-containing stains from textiles or from hard surfaces, in which a washing or cleaning agent and poly-(N,N-dimethylacrylamide) and/or polymers accessible by statistical copolymerization of N,N-dimethylacrylamide with a comonomer selected from acrylamide, methacrylamide, N,N-disubstituted acrylamide, N,N-disubstituted methacrylamide, N',N'-disubstituted aminoalkylmethacrylamide, N,N-disubstituted amino alkylacrylamide, N-acryloylmorpholine, N-acryloylpyrrolidine, N-acryloylpyrrolidone, N-acryloylpiperidone, N-acryloylcaprolactam, N-methacryloylmorpholine, N-methacryloylpyrrolidine, N-methacryloylpyrrolidone, N-methacryloylpiperidone, N-methacryloylcaprolactam, and mixtures thereof are employed, where the substituents in the aforesaid substituted compounds are selected from hydrogen, the benzyl group, linear and branched alkyl and alkoxyalkyl groups having 1 to 6 carbon atoms, and mixtures thereof, with the provision that the substituents in the N,N-disubstituted acrylamide are not two methyl groups.

A washing or cleaning agent containing poly-(N,N-dimethylacrylamide) and/or a polymer accessible by statistical copolymerization of N,N-dimethylacrylamide with a comonomer selected from acrylamide, methacrylamide, N,N-disubstituted acrylamide, N,N-disubstituted methacrylamide, N',N'-disubstituted aminoalkylmethacrylamide, N,N-disubstituted aminoalkylacrylamide, N-acryloylmorpholine, N-acryloylpyrrolidine, N-acryloylpyrrolidone, N-acryloylpiperidone, N-acryloylcaprolactam, N-methacryloylmorpholine, N-methacryloylpyrrolidine, N-methacryloylpyrrolidone, N-methacryloylpiperidone, N-methacryloylcaprolactam, and mixtures thereof, where the substituents in the aforesaid substituted compounds are selected from hydrogen, the benzyl group, linear and branched alkyl and alkoxyalkyl groups having 1 to 6 carbon atoms, and mixtures thereof, with the provision that the substituents in the N,N-disubstituted acrylamide are not two methyl groups, in particular in quantities from 0.2 wt % to 10 wt %.

A statistical poly(N-benzyl-N-ethylacrylamide-co-N,N-dimethylacrylamide) copolymer.

A statistical poly(N-butoxymethylacrylamide-co-N,N-dimethylacrylamide) copolymer.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The subject matter of the invention is the use of poly-(N,N-dimethylacrylamide), and/or of polymers accessible by copolymerization of N,N-dimethylacrylamide with a comonomer selected from acrylamide, methacrylamide, N,N-disubstituted acrylamide, N,N-disubstituted methacrylamide, N',N'-disubstituted amino alkylmethacrylamide, N,N-disubstituted aminoalkylacrylamide, N-acryloylmorpholine, N-acryloylpyrrolidine, N-acryloylpyrrolidone, N-acryloylpiperidone, N-acryloylcaprolactam, N-methacryloylmorpholine, N-methacryloylpyrrolidine, N-methacryloylpyrrolidone, N-methacryloylpiperidone, N-methacryloylcaprolactam, and mixtures thereof, to intensify the primary washing power of washing or cleaning agents with respect to oil- and/or fat-containing stains in the context of washing textiles or cleaning hard surfaces, where the substituents in the aforesaid substituted compounds are selected from hydrogen, the benzyl group, linear and branched alkyl and alkoxyalkyl groups having 1 to 6 carbon atoms, and mixtures thereof, with the provision that the substituents in the N,N-disubstituted acrylamide are not two methyl groups. Among the alkyl groups, ethyl, propyl, and butyl groups, and mixtures thereof, are preferred. Among the alkoxyalkyl groups, alkoxymethyl groups are preferred, the alkoxy part preferably being a propoxy or butoxy group.

If the polymers are copolymers assembled from multiple monomers, they comprise N,N-dimethylacrylamide and the further monomer or monomers preferably at a molar ratio from 1:99 to 99:1, in particular from 70:30 to 98:2, and particularly preferably from 80:20 to 95:5.

The polymeric active agent preferably has an average molecular weight (here and hereinafter number-average in the context of average molecular weight indications) in the range from 1000 g/mol to 500,000 g/mol, in particular from 1100 g/mol to 150,000 g/mol.

The polymer is preferably surface-active in such a way that when it is present at a concentration of 0.2 g/l in water at 25° C., a decrease in surface tension of at least 10%, in particular from 30% to 70%, occurs. Surface activity can be demonstrated by measuring surface tension by means of the Du Nay ring method, for example using a TE3 ring/plate tensiometer of the Lauda company (Lauda—Königshofen). For this, a ring made, for example, of metal that is fastened to a torsion force meter is immersed into water respectively into the aqueous solution in such a way that the ring is located below the surface of the solution. The ring is then slowly pulled out therefrom, and the force exerted on the measurement ring shortly before the liquid film breaks is measured with the torsion force meter. The surface tension can be calculated from a knowledge of the diameter of the ring and the breakaway force. With surface-active substances, surface tension values well below the value for water are obtained.

A further subject of the invention is a method for removing, in particular, oil- and/or fat-containing stains from textiles or from hard surfaces, in which method a washing or cleaning agent and an aforesaid polymeric active agent are employed. This method can be executed manually or automatically, for example with the aid of a household washing machine or automatic dishwasher. It is possible in this context to use the (in particular) liquid agent and the active agent simultaneously or successively. Simultaneous use can be carried out particularly advantageously by employing an agent that contains the active agent.

The active agents used according to the present invention can be manufactured in simple fashion by radical polymerization of the monomers; in the case in which two or more different monomers are employed, this polymerization is carried out as a blockwise or preferably statistical copolymerization. Utilization of the active agents used according to the present invention results in significantly better release of, in particular, fat stains and cosmetic stains on hard surfaces and on textiles, including those made of cotton or having a proportion of cotton, than is the case with the use of compounds hitherto known for this purpose. Alternatively, for a constant fat release capability, significant quantities of surfactants can be saved.

Further subjects are the statistical copolymers poly(N-benzyl-N-ethylacrylamide-co-N,N-dimethylacrylamide) P(BEAm-co-DMAm) and poly(N-butoxymethylacrylamide-co-N,N-dimethylacrylamide) P(BMAm-co-DMAm).

The use according to the present invention can occur in the context of a washing or cleaning process in such a way that the active agent is added to a bath containing washing or cleaning agent, or preferably the active agent is introduced into the bath as a constituent of a washing or cleaning agent, the concentration of active agent in the bath preferably being in the range from 0.01 g/l to 0.5 g/l, in particular from 0.02 g/l to 0.2 g/l.

A further subject of the invention is therefore a washing or cleaning agent containing poly-(N,N-dimethylacrylamide) and/or a polymer accessible by statistical copolymerization of N,N-dimethylacrylamide with a comonomer selected from acrylamide, methacrylamide, N,N-disubstituted acrylamide, N,N-disubstituted methacrylamide, N',N'-disubstituted aminoalkylmethacrylamide, N,N-disubstituted aminoalkylacrylamide, N-acryloylmorpholine, N-acryloylpyrrolidine, N-acryloylpyrrolidone, N-acryloylpiperidone, N-acryloylcaprolactam, N-methacryloylmorpholine, N-methacryloylpyrrolidine, N-methacryloylpyrrolidone, N-methacryloylpiperidone, N-methacryloylcaprolactam, and mixtures thereof.

Washing or cleaning agents that contain an active agent to be used according to the present invention or are used together therewith or are employed in the method according to the present invention can contain all other usual constituents of said agents that do not interact undesirably with the active agent that is essential to the invention. An active agent defined above is incorporated into washing or cleaning agents preferably in quantities from 0.2 wt % to 10 wt %, in particular 0.4 wt % to 5 wt %.

It has been found, surprisingly, that such active agents positively influence the action of specific other washing- and cleaning-agent ingredients, and that conversely, the action of the fat-booster active agent is also additionally intensified by specific other ingredients. These effects occur in particular in the context of synthetic anionic surfactants of the sulfate and sulfonate type, and it is therefore preferred to use these, and optionally one or more of the aforesaid further ingredients, together with active agent to be used according to the present invention.

An agent that contains an active agent to be used according to the present invention or is used together with it or is employed in the method according to the present invention preferably contains synthetic anionic surfactant of the sulfate and/or sulfonate type, in particular alkylbenzenesulfonate, fatty alkyl sulfate, fatty alkyl ether sulfate, alkyl and/or dialkyl sulfosuccinate, sulfofatty acid esters, and/or sulfofatty acid disalts, in particular in a quantity in the range from 2 wt % to 25 wt %. The anionic surfactant is preferably selected from the alkylbenzenesulfonates, alkyl or alkenyl sulfates, and/or alkyl or alkenyl ether sulfates in which the alkyl or alkenyl group possesses 8 to 22, in particular 12 to 18 carbon atoms. These are usually not individual substances but rather cuts or mixtures. Preferred thereamong are those whose proportion of compounds having longer-chain residues in the range from 16 to 18 carbon atoms is above 20 wt %.

A further embodiment of such agents encompasses the presence of nonionic surfactant selected from fatty alkylpolyglycosides, fatty alkylpolyalkoxylates, in particular -ethoxylates and/or -propoxylates, fatty acid polyhydroxyamides, and/or ethoxylation and/or propoxylation products of fatty alkyl amines, vicinal diols, fatty acid alkyl esters, and/or fatty acid amides, as well as mixtures thereof, in particular in a quantity in the range from 2 wt % to 25 wt %.

Among the appropriate nonionic surfactants are the alkoxylates, in particular ethoxylates and/or propoxylates, of saturated or mono- to polyunsaturated linear or branched-chain alcohols having 10 to 22 carbon atoms, preferably 12 to 18 carbon atoms. The degree of alkoxylation of the alcohols is as a rule between 1 and 20, preferably between 3 and 10. They can be manufactured, in known fashion, by reacting the corresponding alcohols with the corresponding alkylene oxides. The derivatives of fatty alcohols are particularly suitable, although their branched-chain isomers, in particular so-called oxo alcohols, can also be used to manufacture usable alkoxylates. The alkoxylates, in particular the ethoxylates, of primary alcohols having linear, in particular dodecyl, tetradecyl, hexadecyl, or octadecyl residues, as well as mixtures thereof, are accordingly usable. Also usable are corresponding alkoxylation products of alkylamines, of vicinal diols, and of carboxylic acid amides that correspond to the aforesaid alcohols in terms of the alkyl portion. Additionally suitable are the ethylene-oxide and/or propylene-oxide insertion products of fatty acid alkyl esters, as well as fatty acid polyhydroxyamides. So-called alkylpolyglycosides suitable for optional incorporation into the agents according to the present invention are compounds of the general formula $(G)_n$-$OR^{12}$, in which $R^{12}$ signifies an alkyl or alkenyl residue having 8 to 22 carbon atoms, G a glycose unit, and n a number between 1 and 10. The glycoside component $(G)_n$ refers to oligomers or polymers from naturally occurring aldose or ketose monomers, among which are included, in particular, glucose, mannose, fructose, galactose, talose, gulose, altrose, allose, idose, ribose, arabinose, xylose, and lyxose. The oligomers made up of glycosidically linked monomers of this kind are characterized not only by the nature of the sugars contained in them but also by their number (the so-called degree of oligomerization). The degree of oligomerization n, constituting a magnitude to be ascertained analytically, generally assumes fractional numerical values; its value is between 1 and 10, for the glycosides preferably used below a value of 1.5, in particular between 1.2 and 1.4. Because of its good availability, glucose is a preferred monomer module. The alkyl or alkenyl portion $R^{12}$ of the glycosides preferably likewise derives from easily accessible derivatives of renewable raw materials, in particular from fatty alcohols, although their branched-chain isomers, in particular so-called oxo alcohols, can also be used to manufacture usable glycosides. The primary alcohols having linear octyl, decyl, dodecyl, tetradecyl, hexadecyl, or octadecyl residues, as well as mixtures thereof, are accordingly usable in particular. Particularly preferred alkyiglycosides contain a coconut fatty alkyl residue, i.e. mixtures where substantially $R^{12}$=dodecyl and $R^{12}$=tetradecyl.

Nonionic surfactant is contained in agents that contain an active agent used according to the present invention, or that are employed in the context of the use according to the present invention, preferably in quantities from 1 wt % to 30 wt %, in particular from 1 wt % to 25 wt %; quantities in the upper part of this range are more likely to be encountered in liquid washing agents, and particulate washing agents preferably contain rather smaller quantities of up to 5 wt %.

The agents can instead or additionally contain further surfactants, preferably synthetic anionic surfactants of the sulfate or sulfonate type, among them e.g. the alkylbenzenesulfonates already recited, in quantities preferably not above 20 wt %, in particular from 0.1 wt % to 18 wt %, based in each case on the total agent. Synthetic anionic surfactants particularly suitable for use in such agents are alkyl and/or alkenyl sulfates, having 8 to 22 carbon atoms, which carry an alkali-, ammonium-, or alkyl- or hydroxyalkyl-substituted ammonium ion as counter-cation. The derivatives of fatty alcohols having, in particular, 12 to 18 carbon atoms, and branched-chain analogs thereof (the so-called oxo alcohols), are preferred. Alkyl and alkenyl sulfates can be manufactured in known fashion by reacting the corresponding alcohol component with a usual sulfating reagent, in particular sulfur trioxide or chlorosulfonic acid, followed by neutralization with alkali, ammonium, or alkyl- or hydroxyalkyl-substituted ammonium bases. Also included among the usable surfactants of the sulfate type are sulfated alkoxylation products of the aforesaid alcohols (so-called ether sulfates). Such ether sulfates contain preferably 2 to 30, in particular 4 to 10 ethylene glycol groups per molecule. Included among the suitable anionic surfactants of the sulfonate type are the α-sulfo esters obtainable by reacting fatty acid esters with sulfur trioxide and subsequent neutralization, in particular the sulfonation products deriving from fatty acids having 8 to 22 carbon atoms, preferably 12 to 18 carbon atoms, and linear alcohols having 1 to 6 carbon atoms, preferably 1 to 4 carbon atoms, as well as the sulfofatty acids proceeding therefrom by formal saponification. Other suitable anionic surfactants are the salts of sulfosuccinic acid esters, which are also referred to as alkylsulfosuccinates or as dialkylsulfosuccinates and represent the monoesters or diesters of sulfosuccinic acid with alcohols, preferably fatty alcohols, and in particular ethoxylated fatty alcohols. Preferred sulfosuccinates contain $C_8$ to $C_{18}$ fatty alcohol residues or mixtures thereof. Particularly preferred sulfosuccinates contain an ethoxylated fatty alcohol residue that, considered per se, represents a nonionic surfactant. Sulfosuccinates whose fatty alcohol residues derive from ethoxylated fatty alcohols having a restricted homolog distribution are, in turn, particularly preferred.

Soaps are appropriate as further optional surfactant-type ingredients; saturated fatty acid soaps, such as the salts of lauric acid, myristic acid, palmitic acid, or stearic acid, and soaps derived from natural fatty acid mixtures, e.g. coconut, palm-kernel, or tallow fatty acids, are suitable. Those soap mixtures that are made up of 50 wt % to 100 wt % saturated $C_{12}$ to $C_{18}$ fatty acid soaps and up to 50 wt % oleic acid soap are particularly preferred. Soap is contained preferably in quantities from 0.1 wt % to 5 wt %. Liquid agents that contain an active agent used according to the present invention can, however, also contain larger quantities of soap, as a rule up to 20 wt %.

The agents can, if desired, also contain betaines and/or cationic surfactants, which (if present) are employed preferably in quantities from 0.5 wt % to 7 wt %.

The agents can contain, if desired, peroxygen-based bleaching agents, in particular in quantities in the range from 5 wt % to 70 wt %, as well as optionally bleach activator, in particular in quantities in the range from 2 wt % to 10 wt %. Appropriate bleaching agents are preferably the peroxygen compounds used as rule in washing agents, such as percarboxylic acids, for example diperdodecanedioic acid or phthaloylaminoperoxycaproic acid, hydrogen peroxide, alkali perborate, which can be present as a tetra- or monohydrate, percarbonate, perpyrophosphate, and persilicate, which as a rule are present as alkali salts, in particular as sodium salts. Bleaching agents of this kind are present in washing agents that contain an active agent used according to the present invention preferably in quantities of up to 25 wt %, in particular up to 15 wt %, and particularly preferably from 5 wt % to 15 wt %, based in each case on the total agent; percarbonate is employed in particular. The bleach activator component that is optionally present comprises the N- or O-acyl compounds that are usually used, for example polyacylated alkylenediamines, in particular tetraacetylethylenediamine, acylated glycourils, in particular tetraacetylglycouril, N-acylated hydantoins, hydrazides, triazoles, urazoles, diketopiperazines, sulfurylamides, and cyanurates, also carboxylic acid anhydrides, in particular phthalic acid anhydride, carboxylic acid esters, in particular sodium isononanoyl phenolsulfonate, and acylated sugar derivatives, in particular pentaacetyl glucose, as well as cationic nitrile derivatives such as trimethylammonium acetonitrile salts. In order to avoid interaction with the per-compounds during storage, the bleach activators can have been granulated and/or coated with encasing substances in known fashion; tetraacetylethylenediamine granulated with the aid of carboxymethyl cellulose and having average particle sizes from 0.01 mm to 0.8 mm, granulated 1,5-diacetyl-2,4-dioxohexahydro-1,3,5-triazine, and/or trialkylammonium acetonitrile formulated in particle form are particularly preferred. Bleach activators of this kind are contained in washing agents preferably in quantities of up to 8 wt %, in particular from 2 wt % to 6 wt %, based in each case on the total agent.

In a further embodiment the agent contains water-soluble and/or water-insoluble builders, selected in particular from alkali aluminosilicate, crystalline alkali silicate having a modulus greater than 1, monomeric polycarboxylate, polymeric polycarboxylate, and mixtures thereof, in particular in quantities from 2.5 wt % to 60 wt %.

The agent contains preferably 20 wt % to 55 wt % water-soluble and/or water-insoluble, organic and/or inorganic builder. Included among the water-soluble organic builder substances are in particular those from the class of polycarboxylic acids, in particular citric acid and sugar acids, as well as polymeric (poly)carboxylic acids, in particular polycarboxylates accessible by oxidation of polysaccharides, polymeric acrylic acids, methacrylic acids, maleic acids, and mixed polymers thereof, which can also contain, polymerized into them, small proportions of polymerizable substances having no carboxylic-acid functionality. The relative molecular weight of the homopolymers of unsaturated carboxylic acids is generally between 5000 g/mol and 200,000 g/mol, that of the copolymers between 2000 g/mol and 200,000 g/mol, preferably 50,000 g/mol to 120,000 g/mol, based on free acid. A particularly preferred acrylic acid/maleic acid copolymer has a relative molecular weight from 50,000 g/mol to 100,000 g/mol. Suitable (although less preferred) compounds of this class are copolymers of acrylic acid or methacrylic acid with vinyl ethers, such as vinyl methyl ethers, vinyl esters, ethylene, propylene, and styrene, in which the proportion of acid is equal to at least 50 wt %. It is also possible to use, as water-soluble organic builder substances, terpolymers that contain two carboxylic acids and/or salts thereof as monomers and, as a third monomer, vinyl alcohol and/or a vinyl alcohol derivative or a carbohydrate. The first acidic monomer or salt thereof is derived from an ethylenically monounsaturated $C_3$ to $C_8$ carboxylic acid and preferably from a $C_3$ to $C_4$ monocarboxylic acid, in particular from (meth)acrylic acid. The second acidic monomer or salt thereof can be a derivative of a $C_4$ to $C_8$ dicarboxylic acid, maleic acid being particularly preferred. The third monomeric unit is constituted in this case by vinyl alcohol and/or preferably by an esterified vinyl alcohol. Vinyl alcohol derivatives that represent an ester of short-chain carboxylic acids, for example of $C_1$ to $C_4$ carboxylic acids, with vinyl alcohol, are particularly preferred. Preferred terpolymers contain 60 wt % to 95 wt %, in particular 70 wt % to 90 wt % (meth)acrylic acid and/or (meth)acrylate, particularly preferably acrylic acid and/or acrylate, and maleic acid and/or maleinate, as well as 5 wt % to 40 wt %, preferably 10 wt % to 30 wt % vinyl alcohol and/or vinyl acetate. Very particularly preferred in this context are terpolymers in which the weight ratio of (meth)acrylic acid and/or (meth)acrylate to maleic acid and/or maleate is between 1:1 and 4:1, preferably between 2:1 and 3:1 and in particular 2:1 and 2.5:1. Both the quantities and the weight ratios are based on the acids. The second acidic monomer or salt thereof can also be a derivative of an allylsulfonic acid that is substituted in the 2-position with an alkyl residue, preferably with a $C_1$ to $C_4$ alkyl residue, or with an aromatic residue that is derived preferably from benzene or benzene derivatives. Preferred terpolymers contain 40 wt % to 60 wt %, in particular 45 to 55 wt % (meth) acrylic acid and/or (meth)acrylate, particularly preferably acrylic acid and/or acrylate, 10 wt % to 30 wt %, preferably 15 wt % to 25 wt % methallylsulfonic acid and/or methallylsulfonate, and as a third monomer 15 wt % to 40 wt %, preferably 20 wt % to 40 wt % of a carbohydrate. This carbohydrate can be, for example, a mono-, di-, oligo-, or polysaccharide, mono-, di-, or oligosaccharides being preferred; sucrose is particularly preferred. The use of the third monomer is presumed to incorporate defined break points into the polymer, which are responsible for the polymer's good biodegradability. These terpolymers generally have a relative molecular weight between 1000 g/mol and 200,000 g/mol, preferably between 2000 g/mol and 50,000 g/mol, and in particular between 3000 g/mol and 10,000 g/mol. Especially for the manufacture of liquid agents, they can be used in the form of aqueous solutions, preferably in the form of 30- to 50-weight-percent aqueous solutions. All the aforesaid polycarboxylic acids are used as a rule in the form of their water-soluble salts, in particular their alkali salts.

Organic builder substances of this kind are contained preferably in quantities of up to 40 wt %, in particular up to 25 wt %, and particularly preferably from 1 wt % to 5 wt %. Quantities close to the aforesaid upper limit are used in pasty or liquid, in particular water-containing, agents.

Crystalline or amorphous alkali aluminosilicates are used in particular as water-insoluble, water-dispersible inorganic builder materials, in quantities of up to 50 wt %, preferably not above 40 wt %, and in liquid agents in particular from 1 wt % to 5 wt %. Among these, the crystalline aluminosilicates of washing-agent quality, in particular zeolite NaA and optionally NaX, are preferred. Quantities close to the aforesaid upper limit are used preferably in solid, particulate agents. Suitable aluminosilicates comprise, in particular, no particles having a particle size greater than 30 μm, and preferably are made up of at least 80 wt % particles having a size less than 10 μm. Their calcium binding capability, which can be determined as indicated in German patent DE 24 12 837, is in the range from 100 to 200 mg CaO per gram. Suitable substitutes or partial substitutes for the aforesaid aluminosilicate are crystalline alkali silicates, which can be present alone or mixed with amorphous silicates. The alkali silicates usable in the agents as builders have a molar ratio of alkali oxide to $SiO_2$ preferably below 0.95, in particular from 1:1.1 to 1:12, and can be present in amorphous or crystalline fashion. Preferred alkali silicates are sodium silicates, in particular amorphous sodium silicates, having a $Na_2O:SiO_2$ molar ratio from 1:2 to 1:2.8. Amorphous alkali silicates of this kind are obtainable commercially, for example, under the name Portil®. Those having a molar ratio of $Na_2O$ to $SiO_2$ from 1:1.9 to 1:2.8 are added in the context of manufacture preferably as a solid and not in the form of a solution. Preferred crystalline silicates, which can be present alone or mixed with amorphous silicates, are crystalline sheet silicates of the formula $Na_2Si_xO_{2x+1} \cdot yH_2O$ in which x, the so-called "modulus," is a number from 1.9 to 4 and y is a number from 0 to 20, and preferred values for x are 2, 3, or 4. Crystalline sheet silicates that are encompassed by this general formula are described, for example, in European patent application EP 0 164 514. Preferred crystalline sheet silicates are those in which x in the general formula recited assumes the values 2 or 3. In particular, both β-nd δ-sodium disilicates ($Na_2Si_2O_5 \cdot yH_2O$) are preferred. Practically anhydrous crystalline alkali silicates manufactured from amorphous alkali silicates and having the aforesaid general formula, in which x denotes a number from 1.9 to 2.1, can also be used in agents that contain an active agent to be used according to the present invention. In a further preferred embodiment of agents according to the present invention, a crystalline sodium sheet silicate having a modulus from 2 to 3 is used, such as the one that can be manufactured from sand and soda. Crystalline sodium silicates having a modulus in the range from 1.9 to 3.5 are used in a further preferred embodiment of washing agents that contain an active agent used according to the present invention. Their alkali silicate content is preferably 1 wt % to 50 wt % and in particular 5 wt % to 35 wt %, based on anhydrous active substance. If alkali aluminosilicate, in particular zeolite, is also present as an additional builder substance, the alkali silicate content is preferably 1 wt % to 15 wt %, and in particular 2 wt % to 8 wt %, based on anhydrous active substances. The weight ratio of aluminosilicate to silicate, based in each case on anhydrous active substances, is then preferably 4:1 to 10:1. In agents that contain both amorphous and crystalline alkali silicates, the weight ratio of amorphous alkali silicate to crystalline alkali silicate is preferably 1:2 to 2:1 and in particular 1:1 to 2:1.

In addition to the inorganic builders recited, further water-soluble or water-insoluble inorganic substances can be contained in the agents that contain an active agent to be used according to the present invention, are used together therewith, or are employed in the method according to the present invention. Alkali carbonates, alkali hydrogen carbonates, and alkali sulfates, as well as mixtures thereof, are suitable in this connection. Additional inorganic material of this kind can be present in quantities of up to 70 wt %.

The agents can additionally contain further constituents that are usual in washing or cleaning agents. Included among these optional constituents are, in particular, enzymes, enzyme stabilizers, complexing agents for heavy metals, for example aminopolycarboxylic acids, aminohydroxypolycarboxylic acids, polyphosphonic acids, and/or aminopolyphosphonic acids, foam inhibitors, for example organopolysiloxanes or paraffins, solvents, and optical brighteners, for example stilbenedisulfonic acid derivatives. Preferably up to 1 wt %, in particular 0.01 wt % to 0.5 wt % optical brighteners, in particular compounds from the class of the substituted 4,4'-bis(2,4,6-triamino-s-triazinyl)stilbene-2,2'-disulfonic acids, up to 5 wt %, in particular 0.1 wt % to 2 wt % complexing agents for heavy metals, in particular aminoalkylenephosphonic acids and salts thereof, and up to 2 wt %, in particular 0.1 wt % to 1 wt % foam inhibitors, are contained in agents that contain an active agent used according to the present invention, the aforesaid weight proportions being based in each case on the total agent.

Solvents, which can be employed in particular in liquid agents, are (besides water) preferably those that are miscible with water. These include the lower alcohols, for example ethanol, propanol, isopropanol, and the isomeric butanols, glycerol, lower glycols, for example ethylene glycol and propylene glycol, and the ethers derivable from the aforesaid classes of compounds. The active agents used according to the present invention are as a rule present in liquid agents of this kind in dissolved or suspended form.

Enzymes that may be present are preferably selected from the group comprising protease, amylase, lipase, cellulase, hemicellulase, oxidase, peroxidase, pectinase, and mixtures thereof. Protease, recovered from microorganisms such as bacteria or fungi, is especially suitable. It can be recovered in known fashion from suitable microorganisms by fermentation processes. Proteases are obtainable commercially, for example, under the names BLAP®, Savinase®, Esperase®, Maxatase®, Optimase®, Alcalase®, Durazym, or Maxapem®. The lipases that are usable can be recovered, for example, from *Humicola lanuginosa*, from *Bacillus* species, from *Pseudomonas* species, from *Fusarium* species, from *Rhizopus* species, or from *Aspergillus* species. Suitable lipases are obtainable commercially, for example, under the names Lipolase®, Lipozym®, Lipomax®, Lipex®, Amano® Lipase, Toyo-Jozo® Lipase, Meito® Lipase, and Diosynth® Lipase. Suitable amylases are commercially available, for example, under the names Maxamyl®, Termamyl®, Duramyl®, and Purafect® OxAm. The cellulase that is usable can be an enzyme recoverable from bacteria or fungi, which exhibits a pH optimum preferably in the weakly acidic to weakly alkaline range from 6 to 9.5. Cellulases of this kind are commercially available under the names Celluzyme®, Carezyme®, and Ecostone®. Suitable pectinases are obtainable, for example, under the names Gamanase®, Pektinex AR®, X-Pect, or Pectaway® from Novozymes, under the name Rohapect OF®, Rohapect TPL®, Rohapect PTE100®, Rohapect MPE®, Rohapect MA plus HC, Rohapect DA12L®, Rohapect 10L®, Rohapect® B 1L from AB Enzymes, and under the name Pyrolase® from Diversa Corp., San Diego, Calif., USA.

Included among the usual enzyme stabilizers that are optionally present, in particular in liquid agents, are aminoalcohols, for example mono-, di-, and triethanolamine and -propanolamine, and mixtures thereof, lower carboxylic acids, boric acid, alkali borates, boric acid/carboxylic acid combinations, boric acid esters, boronic acid derivatives, calcium salts, for example calcium/formic acid combination, magnesium salts, and/or sulfur-containing reducing agents.

Included among the suitable foam inhibitors are long-chain soaps, in particular behenic soap, fatty acid amides, paraffins, waxes, microcrystalline waxes, organopolysiloxanes, and mixtures thereof, which can furthermore contain microfine, optionally silanized or otherwise hydrophobized silicic acid. For use in particulate agents, foam inhibitors of this kind are preferably bound to granular, water-soluble carrier substances.

Included among the soil-release-enabling polymers known to be polyester-active, that can be used in addition to the active agents essential to the invention, are copolyesters of dicarboxylic acids, for example adipic acid, phthalic acid or terephthalic acid, diols, for example ethylene glycol or propylene glycol, and polydiols, for example polyethylene glycol or polypropylene glycol. Included among the soil-release-enabling polyesters preferred for use are those compounds that are accessible formally by esterification of two monomer parts, the first monomer being a dicarboxylic acid HOOC-Ph-COOH and the second monomer a diol HO—($CHR^{11}$—)$_a$)$_b$ OH, which can also be present as a polymeric diol H—(O—($CHR^{11}$—)$_a$)$_b$OH, in which Ph denotes an o-, m-, or p-phenylene residue that can carry 1 to 4 substituents selected from alkyl residues having 1 to 22 carbon atoms, sulfonic acid groups, carboxyl groups, and mixtures thereof, $R^{11}$ denotes hydrogen, an alkyl residue having 1 to 22 carbon atoms, and mixtures thereof, a is a number from 2 to 6, and b is a number from 1 to 300. Preferably, both monomer diol units —O—($CHR^{11}$—)$_a$O— and polymer diol units —(O—

(CHR$^{11}$—)$_a$)$_b$O— are present in the polyesters obtainable therefrom. The molar ratio of monomer diol units to polymer diol units is preferably 100:1 to 1:100, in particular 10:1 to 1:10. In the polymer diol units, the degree of polymerization b is preferably in the range from 4 to 200, in particular from 12 to 140. The molecular weight or average molecular weight, or the maximum of the molecular weight distribution, of preferred soil-release-enabling polyesters is in the range from 250 g/mol to 100,000 g/mol, in particular from 500 g/mol to 50,000 g/mol. The acid on which the Ph residue is based is selected preferably from terephthalic acid, isophthalic acid, phthalic acid, trimellitic acid, mellitic acid, the isomers of sulfophthalic acid, sulfoisophthalic acid, and sulfoterephthalic acid, and mixtures thereof. If their acid groups are not part of the ester bonds in the polymer, they are preferably present in salt form, in particular as an alkali salt or ammonium salt. Among these, the sodium and potassium salts are particularly preferred. If desired, instead of the HOOC-Ph-COOH monomer, small proportions—in particular no more than 10 mol % based on the proportion of Ph having the meaning indicated above—of other acids that comprise at least two carboxyl groups can be contained in the soil-release-enabling polyester. Included among these are, for example, alkylene and alkenylene dicarboxylic acids such as malonic acid, succinic acid, fumaric acid, maleic acid, glutaric acid, adipic acid, pimelic acid, suberic acid, azelaic acid, and sebacic acid. Included among the preferred diols HO—(CHR$^{11}$—)$_a$OH are those in which R$^{11}$ is hydrogen and a is a number from 2 to 6, and those in which a has the value 2 and R$^D$ is selected from hydrogen and the alkyl residues having 1 to 10, in particular 1 to 3 carbon atoms. Among the latter diols, those of the formula HO—CH$_2$CHR$^{11}$—OH, in which R$^{11}$ has the meaning recited above, are particularly preferred. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol, and neopentyl glycol. Polyethylene glycol having an average molar mass in the range from 1000 g/mol to 6000 g/mol is particularly preferred among the polymeric diols.

If desired, these polyesters having the composition described above can also be end-capped, alkyl groups having 1 to 22 carbon atoms and esters of monocarboxylic acids being suitable as terminal groups. The terminal groups bound via ester bonds can be based on alkyl, alkenyl, and aryl monocarboxylic acids having 5 to 32 carbon atoms, in particular 5 to 18 carbon atoms. Included among these are valeric acid, hexanoic acid, oenanthic acid, octanoic acid, pelargonic acid, decanoic acid, undecanoic acid, undecenoic acid, lauric acid, lauroleic acid, tridecanoic acid, myristic acid, myristoleic acid, pentadecanoic acid, palmitic acid, stearic acid, petroselic acid, petroselaidic acid, oleic acid, linoleic acid, linolaidic acid, linolenic acid, eleostearic acid, arachidic acid, gadoleic acid, arachidonic acid, behenic acid, erucic acid, brassidic acid, clupanodonic acid, lignoceric acid, cerotic acid, melissic acid, benzoic acid, that can carry 1 to 5 substituents having a total of up to 25 carbon atoms, in particular 1 to 12 carbon atoms, for example tert-butylbenzoic acid. The terminal groups can also be based on hydroxymonocarboxylic acids having 5 to 22 carbon atoms, included among which are, for example, hydroxyvaleric acid, hydroxyhexanoic acid, ricinoleic acid, its hydrogenation product hydroxystearic acid, as well as o-, m-, and p-hydroxybenzoic acid. The hydroxymonocarboxylic acids can in turn be connected to one another via their hydroxyl group and their carboxyl group, and can thus be present more than once in a terminal group. The number of hydroxymonocarboxylic acid units per terminal group, i.e. their degree of oligomerization, is preferably in the range from 1 to 50, in particular from 1 to 10. In a preferred embodiment of the invention, polymers of ethylene terephthalate and polyethylene oxide terephthalate, in which the polyethylene glycol units have molecular weights from 750 g/mol to 5000 g/mol and the molar ratio of ethylene terephthalate to polyethylene oxide terephthalate is 50:50 to 90:10, are used in combination with an active agent essential to the invention.

The soil-release-enabling polymers are preferably water-soluble; the term "water-soluble" is to be understood as a solubility of at least 0.01 g, preferably at least 0.1 g, of the polymer per liter of water at room temperature and pH 8. Polymers preferred for use exhibit under these conditions, however, a solubility of at least 1 g per liter, in particular at least 10 g per liter.

The manufacture of solid agents according to the present invention presents no difficulties, and can be accomplished in known fashion, for example by spray drying or granulation; enzymes and optional further thermally sensitive ingredients, for example bleaching agents, are added, if applicable, separately later. A method comprising an extrusion step is preferred for the manufacture of agents according to the present invention having an elevated bulk weight, in particular in the range from 650 g/l to 950 g/l.

For the manufacture of agents according to the present invention in the form of tablets, which can be single-phase or multiple-phase, single-colored or multi-colored, and in particular can be made up of one layer or of multiple layers, in particular two layers, it is preferable to proceed in such a way that all the constituents (of each layer, if applicable) are mixed together in a mixer, and the mixture is compressed by means of conventional tablet presses, for example eccentric presses or rotary presses, at compression pressures in the range from approximately 50 N to 100 kN, preferably at 60 to 70 kN. With multi-layer tablets in particular, it can be advantageous if at least one layer is pre-compressed. This is carried out preferably at compression pressures between 5 and 20 kN, in particular at 10 to 15 kN. Break-resistant tablets that are nevertheless sufficiently rapidly soluble under utilization conditions, having fracture strength and flexural strength values normally from 100 to 200 N but preferably above 150 N, are thereby obtained without difficulty. A tablet manufactured in this fashion preferably has a weight from 10 to 50 g, in particular from 15 g to 40 g. The tablets can have any three-dimensional shape and can be round, oval, or polygonal, intermediate shapes also being possible. Corners and edges are advantageously rounded. Round tablets preferably have a diameter from 30 mm to 40 mm. The size in particular of polygonal or cuboidal tablets, which are introduced predominantly via the dispensing apparatus of, for example, the automatic dishwasher, depends on the geometry and volume of that dispensing apparatus. Embodiments that are preferred by way of example have a base outline of (20 to 30 mm)×(34 to 40 mm), in particular of 26×36 mm or 24×38 mm.

Liquid or pasty agents according to the present invention in the form of solutions containing usual solvents, in particular water, are generally manufactured by simply mixing the ingredients, which can be introduced into an automatic mixer in substance or as a solution.

In preferred embodiment, an agent into which active agent to be used according to the present invention is incorporated is liquid, and contains 1 wt % to 15 wt %, in particular 2 wt % to 10 wt % nonionic surfactant, 2 wt % to 30 wt %, in particular 5 wt % to 20 wt % synthetic anionic surfactant, up to 15 wt %, in particular 2 wt % to 12.5 wt % soap, 0.5 wt % to 5 wt %, in particular 1 wt % to 4 wt % organic builder, in particular polycarboxylate such as citrate, up to 1.5 wt %, in particular 0.1 wt % to 1 wt % complexing agent for heavy metals, such as phosphonate and, besides optionally contained enzyme, enzyme stabilizer, dye and/or scent, water and/or water-miscible solvent.

In a further preferred embodiment, an agent into which active agent to be used according to the present invention is incorporated is particulate and contains up to 25 wt %, in particular 5 wt % to 20 wt % bleaching agent, in particular alkali percarbonate, up to 15 wt %, in particular 1 wt % to 10 wt % bleach activator, 20 wt % to 55 wt % inorganic builder, up to 10 wt %, in particular 2 wt % to 8 wt % water-soluble organic builder, 10 wt % to 25 wt % synthetic anionic surfactant, 1 wt % to 5 wt % nonionic surfactant, and up to 25 wt %, in particular 0.1 wt % to 25 wt % inorganic salts, in particular alkali carbonate and/or alkali hydrogen carbonate.

EXAMPLES

Example 1

Manufacturing poly(N-benzyl-N-ethylacrylamide-co-N,N-dimethylacrylamide), P(BEAm-co-DMAm)

The monomers N,N-dimethylacrylamide (DMAm) and N-benzyl-N-ethylacrylamide (BEAm) were dissolved in 300 ml benzene, together with the initiator 2,2'-azobisisobutyronitrile (AIBN) and chain regulator trithiocarboxylic acid butyl ester-4-butylsulfanylthiocarbonylsulfanyl methyl benzyl ester (KR), in the quantities indicated in Table 1. The monomers and the benzene had previously been purified by distillation, and the chain transfer agent and initiator by recrystallization.

TABLE 1

| Sample | $m_{DMAm}$ (g) | $m_{BEAm}$ (g) | $m_{KR}$ (g) | $m_{AIBN}$ (g) | Yield (wt %) |
|---|---|---|---|---|---|
| 1a | 52.36 | 17.64 | 2.84 | 0.2296 | 64 |
| 1b | 52.36 | 17.64 | 0.95 | 0.0765 | 83 |
| 1c | 52.36 | 17.64 | 0.284 | 0.0382 | 87 |

The solutions obtained were purged for 30 min with a fast nitrogen stream (<3 ppm $O_2$). The gas-tight sealed vessels were then placed in an oil bath at 65° C. for 24 h for polymerization. The reaction was then terminated by cooling and venting the reaction mixture. Precipitating each of the reaction mixtures in 2 l ether yielded powdery, hygroscopic polymers. To remove traces of benzene, these were each dissolved in 700 ml water and then freeze-dried. The respective yields after precipitation in ether, drying at 20 mbar/22° C., and freeze-drying from water are listed in Table 1. Analysis of the polymers by $^1$H-NMR spectroscopy indicated that the composition of all the samples was 85 mol % DMAm: 15 mol % BEAm.

A molecular weight determination was carried out using GPC on Polargel L columns in dimethylformamide/0.1 wt % LiBr at 50° C. Detection was performed using a refractive index detector. The eluograms were calibrated by $^1$H-NMR terminal-group analysis. The results are listed in Table 2.

TABLE 2

| Sample | Number-average molar mass |
|---|---|
| 1a | 9236 g/mol |
| 1b | 24,500 g/mol |
| 1c | 67,500 g/mol |

Example 2

Manufacturing poly(N-butoxymethylacrylamide-co-N,N-dimethylacrylamide), P(BMAm-co-DMAm)

The monomers N,N-dimethylacrylamide (DMAm) and N-butoxymethylacrylamide (BMAm) were dissolved in 300 ml benzene, together with the initiator 2,2'-azobisisobutyronitrile (AIBN) and chain regulator trithiocarboxylic acid butyl ester-4-butylsulfanylthiocarbonylsulfanyl methyl benzyl ester (KR), in the quantities indicated in Table 3. The monomer DMAm and the benzene had previously been purified by distillation, and the chain transfer agent and initiator by recrystallization.

TABLE 3

| Sample | $m_{DMAm}$ (g) | $m_{BMAm}$ (g) | $m_{KR}$ (g) | $m_{AIBN}$ (g) | Yield (wt %) |
|---|---|---|---|---|---|
| 2a | 59.12 | 16.625 | 3.075 | 0.310 | 103 |
| 2b | 59.12 | 16.625 | 1.025 | 0.103 | 103 |
| 2c | 59.12 | 16.625 | 0.307 | 0.040 | 111 |

The solutions obtained were purged for 70 min with a fast nitrogen stream (<3 ppm O2). The gas-tight sealed vessels were then placed in an oil bath at 65° C. for 24 h for polymerization. After 5 h (batch 2c) or 20 h (other batches) the polymerization processes were terminated. The benzene was removed on a rotary evaporator. The batches were each precipitated in 4 l ether, the resulting precipitates were each dissolved in 1.2 l water, and freeze-dried. This yielded powdery, highly hygroscopic polymers.

The respective yields after freeze-drying from dioxane or water are indicated in Table 3. Analysis of the polymers by $^1$H-NMR spectroscopy showed a composition of 85 mol % DMAm: 15 mol % BMAm for all samples.

Elemental analysis indicated the presence of notable quantities of retained water: elemental analysis of batch 2c: observed: N: 12.78%; C: 59.46%; N: 9.61%, S: 0.12%. The composition of the four-component mixture is obtained by calculation from these values: DMAm: 77.3 mol %; BMAm: 12.2 mol %; KR: 0.1 mol %; water: 10.4 mol %.

A molecular weight determination was carried out using GPC on Polargel L columns in dimethylformamide/0.1 wt % LiBr at 50° C. Detection was performed using a refractive index detector. The eluograms were calibrated by $^1$H-NMR terminal-group analysis. The results are listed in Table 4.

TABLE 4

| Sample | Number-average molar mass |
|---|---|
| 2a | 9800 g/mol |
| 2b | 35,000 g/mol |
| 2c | 90,000 g/mol |

Example 3

Lowering the Static Surface Tension

Using a Lauda TE3 ring/plate tensiometer, the surface tension values of aqueous solutions of the P(BEAm-co-DMAm) and P(BMAm-co-DMAm) copolymers manufactured in Examples 1 and were measured in water at 25° C. and pH 8.5. The concentration of the polymer was in each case 0.2 g/l.

Table 5 contains the results thereby obtained for the measured reduction in the surface tension of water, $\Delta y = y(\text{water}) - y(\text{polymer solution})$.

TABLE 5

Percentage decrease in surface tension

| Polymer | Δy (%) |
|---------|--------|
| 1a | 37.5 |
| 1b | 36 |
| 1c | 36 |
| 2a | 41 |
| 2b | 39 |
| 2c | 32 |

Example 4

TABLE 6

Washing agent compositions (in wt %)

| | A | B | C | D | E | F | G | H |
|---|---|---|---|---|---|---|---|---|
| C9-13 alkylbenzene-sulfonate, Na salt | 9 | 10 | 6 | 7 | 5 | 15 | 15 | 9 |
| C12-18 fatty alcohol with 7 EO | 8 | 9 | 6 | 7 | 5 | 6 | 11 | 10 |
| C12-14 fatty alcohol sulfate with 2 EO | – | – | 8 | 7 | 10 | 2 | 2 | 5 |
| C12-18 fatty acid, Na salt | 4 | 3 | 3 | 3 | 4 | 2 | 4 | 7 |
| Citric acid | 2 | 3 | 3 | 2 | 2 | 2 | 2 | 3 |
| Sodium hydroxide, 50% | 3 | 3 | 2 | 3 | 3 | 3 | 3 | 4 |
| Boric acid | 1 | 1 | 1 | 1 | 1 | 1 | 1 | 1 |
| Enzymes (amylase, protease, cellulase) | + | + | + | + | + | + | + | + |
| Perfume | 1 | 0.5 | 0.5 | 1 | 1 | 1 | 1 | 1 |
| Propanediol | – | – | – | – | – | 5 | 5 | – |
| Ethanol | 1.5 | 1.5 | 1.5 | 1.5 | 1.5 | 1.5 | 1.5 | 5 |
| PVA/maleic acid copolymer | 0.1 | – | 0.1 | – | – | – | – | – |
| Optical brightener | – | 0.1 | – | 0.1 | 0.2 | 0.2 | 0.2 | 0.2 |
| Opacifier | 0.2 | – | – | – | – | – | – | – |
| Phosphonic acid, Na salt | 0.5 | 0.5 | 0.5 | 0.5 | 0.5 | 0.5 | 0.5 | 0.5 |
| Polymer essential to the invention | 2 | 2 | 2 | 2 | 2 | 2 | 2 | 2 |
| Water | | | | to 100 | | | | |

Example 5

Washing Experiments

Household washing machines (Miele® W 1514) were loaded with 3.5 kg of clean accompanying laundry and with test textiles made of cotton provided with standardized stains (A: make-up, Nivea® Beaute Stay Real 7 caramel; B: lipstick, L'Oréal® 453 rose; C: lipstick, Jade Sweet Nectarine® 83), and ballast soil. 75 ml of washing agent C presented in Example 4 having the polymers P(BMAm-co-DMAm) 2a or P(BEAm-co-DMAm) 1b were metered in, and washing was performed at 40° C. After line-drying and mangling of the test textiles, their whiteness was determined spectrophotometrically (Minolta® CR200-1). Table 7 below indicates the differences in remission values, as averages of six determinations, with respect to the washing agent of otherwise identical composition having no polymer essential to the invention, along with the error of the sixfold determination (LSD).

TABLE 7

Washing results (remission difference; indicated in %)

| | Polymer 2a | LSD | Polymer 1b | LSD |
|---|---|---|---|---|
| A | 10.7 | 4.9 | 8.0 | 3.1 |
| B | 3.2 | 2.0 | 5.8 | 2.4 |
| C | 4.9 | 2.2 | 4.0 | 2.5 |

The washing agent having an active agent to be used according to the present invention exhibited distinctly better primary washing performance than agents of otherwise identical composition having no such active agent.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A washing agent comprising a polymer selected from the group consisting of polymers accessible by copolymerization of N,N-dimethylacrylamide with a comonomer selected from N,N-disubstituted acrylamide, N,N-disubstituted methacrylamide, N',N'-disubstituted amino alkylmethacrylamide, N,N-disubstituted aminoalkylacrylamide, where at least one substituent in the aforesaid substituted compounds is selected from alkoxyalkyl groups having 1 to 6 carbon atoms.

2. The agent according to claim 1, wherein the alkoxyalkyl groups are alkoxymethyl groups.

3. The agent according to claim 1, wherein the polymer is a copolymer, assembled statistically from a plurality of monomers, that comprises N,N-dimethylacrylamide and the further monomer(s) at a molar ratio from 1:99 to 99:1.

4. The agent according to claim 1, wherein the polymer has an average molecular weight in the range from 1000 g/mol to 500,000 g/mol.

5. A method for removing in particular oil- and/or fat-containing stains from textiles, in which a washing or cleaning agent and polymers accessible by statistical copolymerization of N,N-dimethylacrylamide with a comonomer selected from N,N-disubstituted acrylamide, N,N-disubstituted methacrylamide, N',N'-disubstituted amino alkylmethacrylamide, N,N-disubstituted aminoalkylacrylamide, and mixtures thereof are employed, where at least one substituent in the aforesaid substituted compounds is selected from benzyl, and alkoxyalkyl groups having 1 to 6 carbon atoms are contacted with textiles in a washing machine.

* * * * *